United States Patent Office 3,505,351
Patented Apr. 7, 1970

3,505,351
DICHLOROMALEIMIDE-CONTAINING
ANTHRAQUINONE DYESTUFFS
David I. Randall, Easton, Pa., and Wilhelm Schmidt-Nickels, Little York, N.J., assignors to GAF Corporation, New York, N.Y., a corporation of Delaware
No Drawing. Filed Feb. 7, 1966, Ser. No. 526,015
Int. Cl. C09b 62/36, 62/38, 62/40
U.S. Cl. 260—326          3 Claims

ABSTRACT OF THE DISCLOSURE

Anthraquinone dyestuffs which contain up to 4 dichloromaleimide groups are useful in dyeing natural or synthetic textile fibers containing reactive hydrogen atoms such as cellulose with improved depth of shade and brightness and excellent fastness properties to wet treatments and to crocking.

---

This invention relates to a novel fiber-coloring process and to a novel group of chromophoric compounds or dyestuffs useful in such process.

A number of dyeing processes are known in which dyeings of improved fastness properties are obtained by reaction between the dyestuff and the fiber. Among the large number of types of reactive dyes proposed for use in such processes, only a few are commercially useful. Because of the relative scarcity of such dyestuffs and/or their substantial unavailability to large sections of the dyeing trade and/or various disadvantages inherent in their properties or use with respect to procedure, cost, and/or results obtained, there exists a definite need in the industry for new and improved types of reactive dyestuffs and/or methods of dyeing therewith.

It is an object of this invention to provide a novel process for coloring fibers and othe articles in any desired shades of improved fastness properties. Another object of this invention is the provision of a novel group of chromophoric compounds useful in such process. Still another object of this invention is the provision of methods for making such chromophoric compounds. A further object of this invention is the provision of novel colored fibers. A still further object of this invention is the provision of such processes, compounds, and colored products, which will not be subject to one or more of the above disadvantages and which depend upon a reaction between the chromophoric compound and the fibers. Other objects and advantages will appear as the description proceeds.

The attainment of the above objects is made possible by this invention which is based upon the discovery and provision of dyestuffs containing at least one fiber reactive nuclearly substituted group of the formula:

(I) 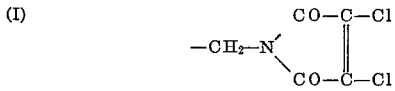

Although one such group in the dyestuff is usually sufficient, dyestuffs containing a plurality, for example, up to 4, such groups may be provided in accordance with the present invention. In general, the group is bonded to an aryl carbocyclic ring of the dyestuff.

The dyestuffs of the invention may be defined as those having the formula:

(II) 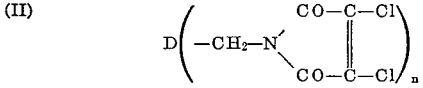

wherein D is a dyestuff molecule, preferably monoazo, anthraquinone or phthalocyanine, and $n$ has a value of at least 1, for example 1 to 4. It will be understood that one or both of the depicted chlorine atoms may with equivalent results be replaced by other halogen atoms such as bromine, fluorine or iodine.

It has been found that the dyestuffs of the present invention as described above are readily and economically manufactured, relatively speaking, and are readily applied to fibrous materials such as textiles, preferably containing a reactive or labile hydrogen atom, from an aqueous medium, preferably under acid binding conditions, by dyeing or printing for the production of dyeings and prints with improved depth of shade, brightness and/or fastness properties including resistance to wet treatments and to crocking.

In Formula II above, D represents a member of any known dyestuff series, preferably a dyestuff of the monoazo, anthraquinone or phthalocyanine series. The monoago dyestuffs may contain coordinately bound metal such as copper, chromium, cobalt or the like.

The terms azo dyestuff, dyestuffs of the azo series, and/or D as employed herein are intended to include as equivalents metallized and unmetallized monoazo dyestuffs, unsubstituted or further substituted by any desired aliphatic or aromatic radicals, auxochrome substituents, solubilizing groups, and the like. Such dyestuffs, their structures, properties and methods of production are well known in the art and no claim is made thereto per se but only to such dyestuffs containing a fiber-reactive group of the Formula I above. Illustratively, any of the monoazo dyestuffs disclosed in U.S. 2,892,671 as suitable for the production of dyestuffs employed in the patented process containing a fiber-reactive halotriazinyl radical joined to the remainder of the dyestuff molecule through a primary or secondary amino group are suitable for use in the present invention wherein the dyestuff molecule is substituted by the above defined group of Formula I instead of the triadinylamino radical, and such patent disclosure is incorporated herein by reference thereto. As is well known, such azo dyestuffs are characterized by an azo group bridging the residue of a diazo component and an azo coupling component, and are prepared by diazotization of a diazotizable primary aromatic amine and coupling the resulting diazo component with the azo coupling component. Both components are aryl or heterocyclic radicals such as α- or β-naphthalene, benzene, thiazole, benzthiazole, pyrazolone, hydroxyquinoline, diphenyl, stilbene, diphenlamine, diphenylether or the like. The diazo component is by definition derived from a diazotizable aromatic primary amine as described, i.e., an aryl or heterocyclic compound containing a diazotizable primary amine radical. Azo coupling components are similarly well documented, as for example, see "Chemistry of Synthetic Dyes," by Venkataraman, Academic Press, 1952, volue I, beginning at page 409. Such compounds are capable of coupling by reason of an anionoid or nucleophilic center in the compound at which coupling with the diazo component takes place. An important group of azo coupling components are the carbocyclic compounds containing a nuclearly substituted hydroxy or amino group directing coupling in ortho or para position thereto. Another important group of azo coupling components are the heterocylic compounds containing a reactive nuclear methylene group usually associated wih an adjacent keto group (ketomethylene linkage) as in the 5-pyrazolones. Still another important group of azo coupling components are the compounds containing an aliphatic or alicyclic ketomethylene group as in the acylacetic acid arylides and esters. Examples of such coupling components include unsubstituted and substituted phenol, naphthol, toluene cresidine, H-acid, 2-amino-5-naphthol-7-sulfonic acid, 1-phenyl-3-methyl-5-pyrazolone, acetoacetanilide, and the like. The above defined fiber reactive group of Formula I may be substituted in either the diazo component or the coupling component or both prior to or subsequent to the coupling reaction.

Similarly, the terms D, anthraquinone dyestuff, dyestuff of the anthraquinone series, and/or anthraquinone structural formulae are intended to include as equivalents the many anthraquinone intermediates, substituted and fused ring derivatives or polycyclic ketones well known in the dyeing art and disclosed for example in Chapter 7 of Lubs "Chemistry of Synthetic Dyes and Pigments" (1955), Rheinhold Publishing Corp. By way of example, the above described fiber-reactive group of the invention may be substituted in benzanthrone, 4,4'-bibenzanthrone, dibenzathrone, anthrapyridone, anthrapyrimidine, anthrapyridazone, anthrapyrazole, anthraisothiazole, anthraquinoneanthraimide, anthraquinonenaphthocarbazole, benzanthraquinone, 1,2-pyrimidino-anthraquinone, 1-amino-4-methylamino-2-anthraquinonecarboxamide, 1,8- and 1,6-pyrenedione, anthranthrone, dibenzopyrenedione, pyranthrone, acedianthrone, 1,1'-, 1,2'- and 2,2'-dianthrimide, anthraquinonecarbazoles, 3,3'-bianthrapyrazoledione, benzanthrone-anthrapyrazolone, 1,2-anthraquinonepyrazoles, anthraquinone-oxazoles, -thiazoles and -imidazoles, anthraquinonethiophenes, anthraquinoneoxadiazoles, 3,4, 9,10-perylenetetracarboxylicdiimide and N-alkyl and -aryl derivatives thereof, benzanthroneacridine, flavanthrone, anthraquinoneacridones, indanthrone, thiapyrans, thiaxanthones, and the like.

Similarly, the terms phthalocyanine dyestuff, dyestuff of the phthalocyanine series, D and/or Pcy as employed herein are intended to include as equivalents unmetallized phthalocyanine molecules, metal phthalocyanine molecules, and such molecules bonded through any desired monoatomic or polyatomic linkage to one or more pendant aryl radicals, e.g., 1 to 4 phenyl radicals. As examples of metal phthalocyanine molecules there may be mentioned the preferred copper, in addition to cobalt, aluminum, nickel, iron, zinc, vanadium, tin, magnesium, chromium, and other metal phthalocyanines. Whether metallized or unmetallized, the phthalocyanine molecule may be nuclearly substituted by one or more lower alkyl such as methyl or ethyl, halogen such as chlorine or bromine, sulfonic, or phenyl groups. As stated, one or more of the fiber-reactive groups of Formula I above are bonded directly to phenylene nucleii in the fundamental phthalocyanine molecule or, when the dyestuff is a phenyl- or other aryl-substituted phthalocyanine molecule, to either or both the fundamental phenylene nucleus and the pendant phenyl or other aryl substituent.

In dyestuffs containing pendant aryl nucleii the pendant nucleus may be bonded to the fundamental phthalocyanine nucleus through any of the known mono-, di-, or tri-atomic bridging links. Examples of such bridging links joining pendant aryl nucleii to the fundamental phthalocyanine nuclei are disclosed in U.S. Patents 2,795,584, 2,795,583, 2,542,328, 2,479,491, etc. Illustratively, such suitable bridging links include —O—, —NR—, —NRSO$_2$—, —SO$_2$NHNH—,
—CH$_2$—, —C$_2$H$_4$—, —CH$_2$SO$_2$—, —CH$_2$NR—,
—CH$_2$S—, —CH$_2$O—, —CO—, —S—, —CONH—,
—NHCO—,
and
—SCH$_2$—, the actual linking atoms in such bridging links being generally C, S, O or N or any combination thereof. Methods for producing such pendant aryl-substituted phthalocyanine dyestuffs are disclosed in the prior art and will otherwise become apparent to persons skilled in the art.

The dyestuffs of this invention are preferably water soluble, the dyestuff moiety containing for this purpose at least one water solubilizing ionogenic group such as sulfonic and/or carboxylic acid or salt thereof or the like. The dyestuffs may in general be prepared by reacting a monoazo, anthraquinone or phthalocyanine dyestuff containing at least one vacant aryl position available for substitution with at least equimolar amounts of dichloromaleimide and formaldehyde. When the dyestuff contains more than one such vacant position, all or part of such additional positions may be substituted by fiber-reactive groups as defined above by employing correspondingly increased molecular proportions of the said reactants. This reaction is carried out in concentrated sulfuric acid (e.g., ca. 90–100%) and under ambient or preferably elevated temperatures, for example up to below boiling point of the medium. This reaction involving intermediate formation of N-methyloldichloromaleimide may be depicted by the following Equation III wherein D and $n$ have the values given above, and $m$ is preferably 0 but may have a value of, for example, 1 to 13.

(III)
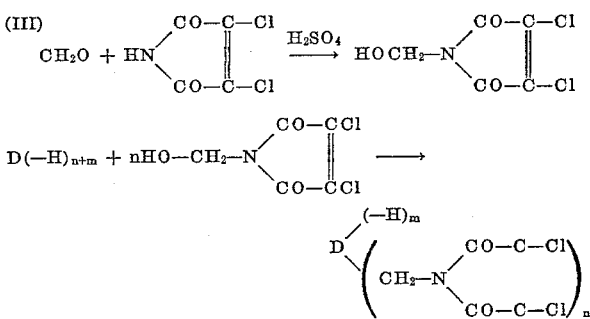

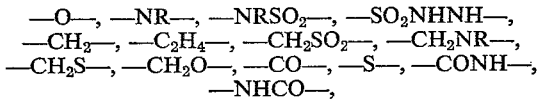

Alternatively, the dyestuffs of the invention may be prepared by reaction of one mole of a dyestuff containing $n+m$ reactive halogen atoms, preferably chlorine or bromine, which may be nuclearly substituted or part of a reactive group such as —CH$_2$Cl, —COCl, —SO$_2$Cl, or the like, with $n$ moles of a previously prepared intermediate of the formula:

(IV)
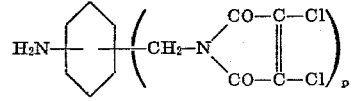

wherein $p$ is 1 to 3 under acid binding conditions. In the resulting dyestuffs, the intermediate of Formula IV will be bonded to the dyestuff moiety through the depicted H$_2$N— group which will be converted to, respectively, an —NH—, —CH$_2$NH—, —CONH—, —SO$_2$NH— linkage or the like.

The intermediate of Formula IV above, which may contain other nuclear substituents such as sulfonic, carboxylic, alkyl or the like, is prepared by reacting $p$ moles of dichloromaleimide and formaldehyde in sulfuric acid as above with one mole of an aminobenzene.

Still another method of preparing the dyestuffs of the invention involves insertion of the fiber-reactive group of Formula I above in the diazo component or coupling component prior to the coupling reaction, as by reacting either or both such components with at least an equimolar amount of dichloromaleimide and formaldehyde, or by reacting either or both such components containing a reactive halogen atom with an intermediate of Formula IV in the manner described above. Alternatively, the intermediate of Formula IV may itself be employed as the diazo component for coupling with any desired coupling component which may also contain a fiber-reactive group of Formula I above.

Another method of making the dyestuffs of the present invention involves a reaction similar to that shown in Equation III above but wherein the dichloromaleimide is substituted by the ammonium salt of dichloromaleamic acid having the formula:

(V)
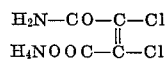
$$H_2N-CO-C-Cl$$
$$H_4NOOC-C-Cl$$

prepared by the reaction of dichloromaleic anhydride with ammonia in benzene. Such use of the compound of Formula V similarly involves the intermediate production of N-methylol-dichloromaleimide, and it will be understood that in the above reactions, the N-methylol-dichloromaleimide can be previously prepared and employed for reaction with the dyestuff in the above described manner. It will likewise be understood that when formaldehyde is referred to as reactant, para formaldehyde is employed as illustrated in the examples below.

The dyestuffs of the invention produced by the foregoing reactions are readily separated from the reaction medium by filtration, if desired after previous drowning in ice water and/or salting out. Such dyestuffs are highly effective for coloring natural and synthetic fibers containing reactive hydrogen atoms, particularly cellulose textile fibers, in any desired shades of good to excellent fastness properties. The coloring process involves dyeing (including printing) the fibrous material by application thereto under acid binding conditions of an aqueous medium containing at least one of the above defined dyestuffs of the invention at any temperature ranging from ambient temperatures to below the boiling point of the medium.

It will be understood that as employed herein, the term "aqueous medium" is intended to include the preferred aqueous solutions of the dyestuffs in addition to dispersions or stable colloidal suspensions thereof, properly thickened in known manner when employed in a printing process. It will also be understood that while aqueous media are preferred, the water in the aqueous medium may be replaced in whole or in part by a water miscible, organic solvent such as acetone, alcohol, dioxane, dimethylformamide, N-methylpyrrolidone, or the like without departing from the scope of this invention. Similarly, such medium may contain adjuvants commonly used in dyeing processes as for example solution aids such as urea and thiodiglycol, migration inhibitors such as cellulose ethers, sodium chloride, sodium sulfate and other salts, wetting agents preferably of the anionic, or nonionic surface active type as produced for example by polyoxyethylenation of such reactive hydrogen containing compounds as higher molecular weight alcohols, phenols, fatty acids and the like, buffering agents such as mixtures of monosodium and disodium (or corresponding potassium) phosphates or aryl sulfonamides, and protective colloids and thickening agents for the production of printing pastes such as methyl cellulose, sodium alginate, and the like.

The aqueous medium containing the reactive dyestuffs of the invention may be applied to the fiber by immersion, jig dyeing, padding, spraying, printing or in any other desired manner and involves a reaction between the dyestuff and the fiber containing a reactive hydrogen atom by an as yet not understood mechanism since the double bond in N-methylol-dichloromaleimide is hindered by the four substituent groups on the ethylenically bound carbon atoms and the chlorine atoms are purportedly deactivated by the double bond. The reaction is generally favored by acid binding conditions preferably achieved by application of an acid binding agent to the fiber together with, prior to or subsequent to application of the dyestuff. As suitable acid binding agents, there may be mentioned generally alkali metal (sodium, potassium, lithium, etc.) hydroxide, carbonate, bicarbonate, phosphate, silicate, borate, acetate or the like, in any suitable amount which may range from less than 0.5% up to 10% or more based on the weight of the aqueous medium containing the reactive dyestuff. Instead of the above defined acid binding agents, a substance may be employed which liberates an acid binding agent upon subsequent subjection to elevated temperatures. An example of such a substance is sodium trichloroacetate, and the use of such a substance requires subsequent application of elevated temperatures such as by dry heat or steam.

In carrying out the coloring process, the speed of reaction between the fiber and the fiber-reactive chromophoric compound will generally vary directly with the temperature. The fiber, for example in the form of a fabric, may be continuously padded with the fiber-treating medium, and then, if desired after a gentle squeezing, may be wound on a roller with alternating sheets of polyethylene packaging film, and/or the entire roll wrapped in a polyethylene package, and the package held at room temperature or slightly higher until completion of the desired reaction between the fiber and the reactive chromophoric compound has taken place. This may require several hours or more. Alternatively, the fiber may be allowed to remain in the fiber-treating medium at room or elevated temperatures up to the boiling point of the medium until the coloring process is completed which may range from 10 minutes or less to several hours or more. Preferably, the fiber is continuously padded with the fiber-treating medium containing the chromophoric compound, squeezed to, for example, a 50 to 200% liquor pickup, dried and heated to 90 to 150° C. for an hour or more to 30 seconds or less, followed by washing and rinsing. A dry heat treatment may be substituted by a steaming or the like if desired.

The dyeing process of this invention is particularly effective for dyeing and printing cellulosic fibers of natural or synthetic type such as cotton, linen, wood, paper, regenerated cellulose and the like in any desired shades of good to excellent fastness properties. A cross linking reaction is favored, leading to enhanced fastness properties, when the dyestuff contains two or more of the defined fiber-reactive groups.

In addition to cellulose and its derivatives, the invention may be employed for dyeing other fibers containing reactive hydrogen atoms as present for example directly on a carbon, nitrogen or other atom in the linear chain of the fiber polymer, or in a free side group bonded directly or indirectly thereto such as —NRH, —SH, —OH, and the like. As representative of such other fibers, there may be mentioned natural and synthetic proteinaceous fibers such as wool, silk, leather, animal hides and skins, casein, and zein, polyamides such as the 6-, and 6,6- nylons and polypyrrolidone, polyurethanes, polyesters, copolymers or homopolymers containing recurring carboxylic, hydroxy or amide linear or side groups, polyvinyl alcohol, partially hydrolyzed cellulose acetate and polyvinyl acetate, polyvinyl chloride and mixtures, copolymers and graft copolymers thereof. Mixed fabrics and fibers may be similarly treated, and concurrent use of different fiber-reactive dyestuffs of the present invention can be made for the production of novel and improved effects in any manner desired.

The fibers may be in any of the usual forms and in natural bulk, interwoven, knitted or felted form as for example in the form of tow, rope, yarns, slubbings, warps, fabrics, felts, and the like, and treated as a wound package, running length, fibrous stock, bulk, etc. Further, although this invention has been described for use in the coloration of fibrous material, it will be understood that the process may be employed for dyeing other articles including film and sheet material, and other objects of any size, shape and configuration without departing from the spirit and scope of this invention, and the fundamental concepts and teachings thereof.

The following examples are only illustrative of the present invention and are not to be regarded as limitative. All parts and proportions referred to herein and in the appended claims are by weight unless otherwise indicated.

EXAMPLE 1

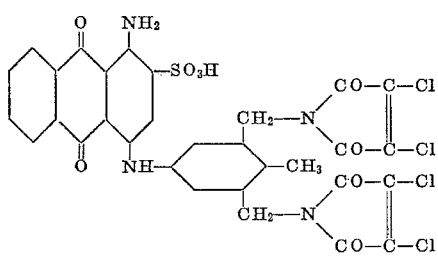

(a) 2.9 parts by weight of 1-amino-4-(para-toluidino)-anthraquinone-2-sulfonic acid sodium salt are dissolved in 20 parts by volume conc. sulfuric acid (96%). To the solution is added at room temperature 2.6 parts by weight of dichloromaleimide and then gradually 0.5 part by weight paraformaldehyde. The charge is agitated at room temperature for 1 hour and at 50° C. for 1 hour. Then another 1.3 parts by weight dichloromaleimide and 0.24 part by weight paraformaldehyde are added and stirring continued for 2½ hours more at 70° C. After cooling to room temperature the solution is drowned in ice and the precipitated dyestuff filtered and washed with ice water.

(b) 3 parts of the above dyestuff are introduced with stirring into 130 parts water and the dye bath stirred at room temperature for 5 minutes. At 35° C., 3 parts of sodium carbonate are then added and the bath stirred for 5 minutes. Cotton cloth is padded with the solution and the cloth dried and heat cured at 150° C. for 3 minutes after which it is boiled in soap water to remove unreacted dye, rinsed and dried. A blue dyeing is obtained having excellent fastness properties.

(c) 3 parts of the above dyestuff are introduced into 130 parts of water and the dye bath stirred at room temperature for 5 minutes. Cotton cloth is padded with the dye bath solution and then with a solution of 3 parts sodium carbonate in 130 parts water after which the cloth is dried and heat cured at 150° C. for 3 minutes. After soaping, rinsing and drying, a dyeing is obtained with properties similar to that of (b) above.

(d) A print paste is prepared with 3 parts of the above dyestuff, 10 parts urea, 1 part sodium m-nitrobenzenesulfonate, 24 parts hot water, 60 parts sodium alginate, and 2 parts sodium bicarbonate. Cotton cloth is printed with the paste, vat aged for 10 minutes, rinsed cold and then soaped for 3 minutes at 90° C. The prints have as good properties as the dyeings. Similar results are obtained when the bicarbonate is substituted by 1 part of NaOH.

EXAMPLE 2

Results similar to those of Example 1 are obtained when the initial 2.6 parts, and subsequent 1.3 parts, of dichloromaleimide are replaced by respectively, 3.1 parts and 1.6 parts of the ammonium salt of dichloromaleamic acid.

EXAMPLE 3

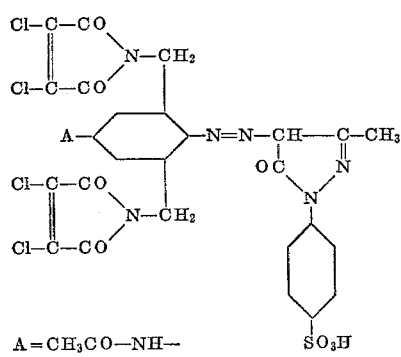

A charge of 30 parts by volume conc. sulfuric acid (96%), 4.6 parts by weight of the azo dyestuff obtained by coupling diazotized 4-aminoacetanilide with 1-(4'-sulfophenyl)-3-methylpyrazolone-5, 3.7 parts by weight dichloromaleimide, and 0.67 part by weight paraformaldehyde is agitated at room temperature for 2 hours and then at 48.53° C. for 3 hours, cooled and drowned in ice.

When the resulting dyestuff of the above formula is applied to cotton by the procedure of Example 1(b)–(d), washfast orange dyeings and prints are obtained.

EXAMPLE 4

4.9 parts by weight of the azo dyestuff from diazotized p-anisidine and 1-(4'-sulfophenyl)-3-methylpyrazolone-5 powder 83% (=4.1 parts by weight 100%) are dissolved in 25 parts by volume conc. sulfuric acid (96%). To the solution is added 5.0 parts by weight dichloromaleimide and then gradually 0.9 part by weight paraformaldehyde. The solution is agitated at room temperature for 1 hour, then at 48–52° C. for 1 hour, cooled and drowned in ice. The resulting dyestuff has the formula shown in Example 3 but wherein A is $CH_3O-$.

Application of this dyestuff to cotton by the methods of Example 1(b)–(d) gives washfast yellow dyeings and prints.

EXAMPLE 5

To a solution of 257 parts 100% $H_2SO_4$ containing 7.2 parts copper phthalocyanine is added 8.4 parts dichloromaleimide and 1.5 parts paraformaldehyde. The resulting solution is held at 90° C. for 4 hours. The condensation product is isolated by pouring into ice and water, filtering and washing acid free. 12.5 parts of product, of the following formula, are obtained:

(a) 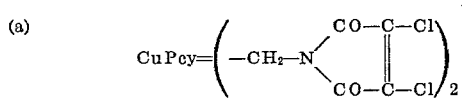

Condensation product (a) is sulfonated in the following manner:

12.0 parts condensation product (a) are dissolved in 281 parts 9.6% oleum. The temperature is held at 90° C. for 4 hours. The workup is the same as for the said condensation product. The filter cake is freed of acid by washing with 5% salt solution. The yield of product, of the following formula, is 10 parts.

(b) 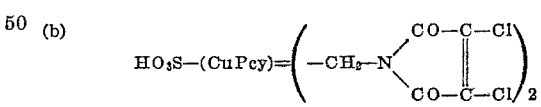

Sulfonation at 95° C. for 18 hours yields the corresponding disulfonated product. When applied as described in Example 1(b)—(d), product (b) yields washfast bright turquoise dyeings and prints.

EXAMPLE 6

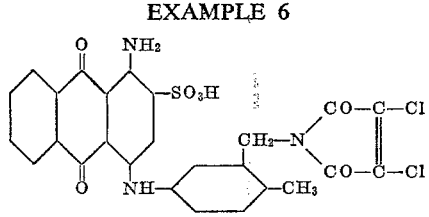

The dyestuff of the above formula is prepared by the procedure described in Example 1 above but employing suitably lower proportions of dichloromaleimide and paraformaldehyde. When this dyestuff is applied by the methods of Example 1(b)–(d), substantially similar dyeings and prints are obtained having somewhat lower wash-fastness properties.

This invention has been disclosed with respect to certain preferred embodiments, and there will become obvious to persons of ordinary skill in the art various modifications and variations thereof which are intended to be included within the spirit and purview of this invention and application and the scope of the appended claims.

We claim:
1. An anthraquinone dyestuff having the formula

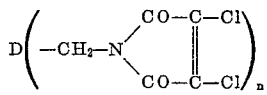

wherein D is anthraquinone, $n$ has a value of 1 to 4, and the group depicted as enclosed in parenthesis is bonded to an aryl carbocyclic ring in D.

2. A water soluble sulfonic acid-containing dyestuff as defined in claim 1.

3. An anthraquinone dyestuff of the formula

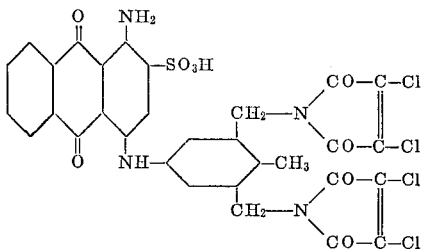

References Cited

UNITED STATES PATENTS 2,933,365  4/1960  Moore _____ 260—152 XR

FLOYD D. HIGEL, Primary Examiner

U.S. Cl. X.R.

8—10, 12, 13, 39, 40, 41, 54.2, 63, 71; 260—150, 152, 155, 162, 163, 261, 297, 303, 307.5, 309.2, 310, 312, 314.5, 316, 328, 329

PO-1050
(5/69)

UNITED STATES PATENT OFFICE

CERTIFICATE OF CORRECTION

E-1661

Patent No. 3,505,351      Dated April 7, 1970

Inventor(s) David I. Randall et al

It is certified that error appears in the above-identified patent and that said Letters Patent are hereby corrected as shown below:

Column 3, line 15, "dibenzathrone" should read -- dibenzanthrone --; line 20, "anthranthrone" should read -- anthanthrone --; Column 8, line 7, "48.53°C." should read -- 48-53°C. --.

SIGNED AND
SEALED
NOV 17 1970

(SEAL)
Attest:

Edward M. Fletcher, Jr.
Attesting Officer

WILLIAM E. SCHUYLER, JR.
Commissioner of Patents